(12) United States Patent
Chang et al.

(10) Patent No.: US 7,329,301 B2
(45) Date of Patent: Feb. 12, 2008

(54) SILVER NANOPARTICLES MADE IN SOLVENT

(75) Inventors: Yun C. Chang, Rochester, NY (US); Eric R. Schmittou, Rochester, NY (US); Peter J. Cowdery-Corvan, Webster, NY (US); Seshadri Jagannathan, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 433 days.

(21) Appl. No.: 10/953,427

(22) Filed: Sep. 29, 2004

(65) Prior Publication Data

US 2006/0065075 A1    Mar. 30, 2006

(51) Int. Cl.
*B22F 1/00* (2006.01)
*B22F 1/02* (2006.01)
*B22F 9/00* (2006.01)
*C21B 15/04* (2006.01)
*C21B 5/20* (2006.01)
*C22C 1/04* (2006.01)

(52) U.S. Cl. ............................ 75/252; 75/228; 75/255; 75/343; 75/371; 428/543; 428/546; 422/28; 219/210

(58) Field of Classification Search .................. 75/252, 75/255, 362, 365, 369, 371; 423/1
See application file for complete search history.

(56) References Cited

U.S. PATENT DOCUMENTS

| | | | |
|---|---|---|---|
| 3,871,887 A | 3/1975 | Jones | |
| 4,552,980 A | 11/1985 | Gabrielsen | |
| 4,677,143 A | 6/1987 | Laurin et al. | |
| 4,886,505 A | 12/1989 | Haynes et al. | |
| 5,135,780 A | 8/1992 | Kissel | |
| 5,256,622 A * | 10/1993 | Henzel | 503/227 |
| 6,645,444 B2 * | 11/2003 | Goldstein | 423/1 |
| 6,676,727 B2 | 1/2004 | Pozarnsky | |
| 2002/0009414 A1 | 1/2002 | Moser et al. | |
| 2003/0130114 A1 | 7/2003 | Hampden-Smith et al. | |
| 2004/0026258 A1 | 2/2004 | No et al. | |

OTHER PUBLICATIONS

Sondi et al. ("Preparation of Highly Concentrated Stable Dispersion of Uniform Silver Nanoparticles", Journal of Collide and Interface Science 260 (2003) 75-81.*
Ruttens F: "Polyvinylbutyral, More Than Just a Binder", Journal of Imaging Science and Technology, Society of Imaging Science and Technology, Springfield, VA, US, vol. 43, No. 6, Nov. 1999, pp. 535-539.
*Solid State Ionics*, vol. 32/33, (1989), pp. 198-205, "Homogeneous and Heterogeneous Nucleations in the Polyol Process for the Preparation of Micron and Submicron Size Metal Particles" by F. Fievet, et al.
*Advanced Materials*, vol. 10, No. 13 (1998), pp. 1032-1035, "Monodisperse Ferromagnetic Particles for Microwave Applications" by P. Toneguzzo, et al.
*Journal of American Chemical Society*, vol. 125, (2003), "Completely Green Synthesis and Stabilization of Metal Nanoparticles" by P. Raveendran, et al.

* cited by examiner

*Primary Examiner*—Roy King
*Assistant Examiner*—Weiping Zhu
(74) *Attorney, Agent, or Firm*—Andrew J. Anderson; Sarah Meeks Roberts

(57) ABSTRACT

This invention relates to a composition of matter comprising associated predominantly silver nanoparticles, and a method of making the nanoparticles. It further relates to articles comprising the nanoparticles.

38 Claims, 1 Drawing Sheet

SILVER NANOPARTICLES MADE IN SOLVENT

FIELD OF THE INVENTION

The present invention relates to a method for generating colloidal silver nanoparticles in non-aqueous media and the resulting compositions. The silver nanoparticles have many uses including antimicrobial applications and use as a conductive material.

BACKGROUND OF THE INVENTION

Silver has long been known to be useful as a conductive material and for its antimicrobial effect. The antimicrobial properties of silver have been known for several thousand years. The general pharmacological properties of silver are summarized in "Heavy Metals"—by Stewart C. Harvey and "Antiseptics and Disinfectants: Fungicides; Ectoparasiticides"—by Stewart Harvey in *The Pharmacological Basis of Therapeutics*, Fifth Edition, by Louis S. Goodman and Alfred Gilman (editors), published by MacMillan Publishing Company, NY, 1975. It is now understood that the affinity of silver ion to biologically important moieties such as sulfhydryl, amino, imidazole, carboxyl and phosphate groups are primarily responsible for its antimicrobial activity.

The attachment of silver ions to one of these reactive groups on a protein results in the precipitation and denaturation of the protein. The extent of the reaction is related to the concentration of silver ions. The interaction is primarily with the proteins in the interstitial space when the silver ion concentration is low; the interaction is with the membrane proteins and intracellular species when the silver ion concentration is high. The diffusion of silver ion into mammalian tissues is self regulated by its intrinsic preference for binding to proteins as well as precipitation by the chloride ions in the environment. Thus, the very affinity of silver ion to a large number of biologically important chemical moieties (an affinity which is responsible for its action as an antimicrobial agent) is also responsible for limiting its systemic action—silver is not easily absorbed by the body. This is a primary reason for the tremendous interest in the use of silver containing species as an anti-microbial i.e. an agent capable of destroying or inhibiting the growth of microorganisms, including bacteria, yeast, fungi and algae, as well as viruses.

In addition to the affinity of silver ions to biologically relevant species, which leads to the denaturation and precipitation of proteins, it is known that some silver compounds having low ionization or dissolution ability function effectively as antiseptics. Distilled water in contact with metallic silver becomes antibacterial, even though the dissolved concentration of silver ions is less than 100 ppb. There are numerous mechanistic pathways by which this oligodynamic effect is manifested, that is, by which silver ion interferes with the basic metabolic activities of bacteria at the cellular level, thus leading to a bacteriocidal and/or bacteriostatic effect.

A detailed review of the oligodynamic effect of silver can be found in "Oligodynamic Metals" by I. B. Romans in *Disinfection, Sterlization and Preservation*, C. A. Lawrence and S. S. Bloek (editors), published by Lea and Fibiger (1968) and "The Oligodynamic Effect of Silver" by A. Goetz, R. L. Tracy and F. S. Harris, Jr. in *Silver in Industry*, Lawrence Addicks (editor), published by Reinhold Publishing Corporation, 1940. These reviews describe results that demonstrate that silver is effective as an antimicrobial agent towards a wide range of bacteria. However, it is also known that the efficacy of silver as an antimicrobial agent depends critically on the chemical and physical identity of the silver source. The silver source may be silver in the form of metal particles of varying sizes, silver as a sparingly soluble material such as silver chloride, silver as a highly soluble salt such as silver nitrate, etc. The efficiency of the silver also depends on i) the molecular identity of the active species—whether it is $Ag^+$ ion or a complex species such as $(AgCl_2)^-$, etc., and ii) the mechanism by which the active silver species interacts with the organism, which depends on the type of organism. Mechanisms may include, for example, adsorption to the cell wall which causes tearing; plasmolysis where the silver species penetrates the plasma membrane and binds to it; adsorption followed by the coagulation of the protoplasma; or precipitation of the protoplasmic albumin of the bacterial cell, etc. The antibacterial efficacy of silver is determined by the nature and concentration of the active species, the type of bacteria, the surface area of the bacteria that is available to interaction with the active species, the bacterial concentration, the concentration and/or the surface area of species that could consume the active species and lower its activity, the mechanisms of deactivation and so on.

It is clear from the literature on the use of silver based materials as antibacterial agents that there is no general procedure for precipitating silver based materials and/or creating formulations of silver based materials that would be suitable for all applications. Since the efficacy of the formulations depends on so many factors, there is a need for i) a systematic process for generating the source of the desired silver species, ii) a systematic process for creating formulations of silver based materials with a defined concentration of the active species; and iii) a systematic process for delivering these formulations for achieving predetermined efficacy. It is particularly a need for processes which are simple and cost effective.

There is also a need for good conductive materials. Substrates such as polymeric films or glass having an indium tin oxide (ITO) coating thereon are widely used in display devices. The requirements of such a coating are good transparency and electric conductivity. ITO coated substrates are used in applications which include touch panel devices. Touch panel devices have two opposing surfaces of the ITO films separated by spacers. Contact between the two surfaces is made when the front surface is depressed. The location of the input is decoded by an electronic interface. LCD devices include an array of transparent ITO electrodes. The electrodes are fabricated by patterning ITO coating on the substrate. In Electro-Luminescence (EL) displays electricity is converted to light. EL displays have a light-emitting layer sandwiched between two electrodes, one of which is ITO. There are a number of other applications using ITO coatings.

With the proliferation of portable electronic devices such as pagers, phones and notebook computers, ruggedness becomes an important factor in choosing a conductive coating. Since an ITO coating is relatively brittle it is highly desirable to find a more rugged conductive coating to replace ITO.

Silver is known to be an excellent conductor. If silver particles are small enough that they do not block significant amount of light and if particles are interconnected in a coating, it is possible to have a coating of silver particles on a substrate that exhibits high electric conductivity, good transparency and ruggedness.

F. Fievet, et al. disclosed a method in 1989 that used a so-called polyol process to make metallic micro particles ("Solid State Ionics", Volume 32/33, (1989)). The polyol method mixes metal precursor in ethylene glycol or tetraethylene glycol and then heats the mixture to 120 to 200 C for one to three hours. The polyol process relies on ethylene glycol and high temperature for the formation of the small metal particles. P. Toneguzzo, et al. disclosed in 1998 a refined polyol method for synthesizing nano-size polymetallic particles. ("Advanced Materials", Volume 10, (1998). They used silver or platinum ion as a nucleation agent and then grew other metals to the nuclei. P. Raveendran, et al. disclosed in 2003 a method to make silver nanoparticles in water ("Journal of American Chemical Society", Volume 125, (2003)). The aqueous method used β-D-glucose to reduce silver nitrate solution in the presence of starch. U.S. Pat. No. 6,676,727 describes a method of preparing small particles of copper and aluminum by evaporating the metals and collecting the vaporized metal in liquid.

All these methods make metal particles that suspend freely and independently from one another. Intrinsic association of metal particles is important for conductive coating applications. It is clear from the literature on the preparation of metal particles that there is no method for preparing associated small particles.

U.S. Pat. No. 4,677,143 describes an antimicrobial composition comprising a binder and an antimicrobial metal compound, said binder having a sufficiently low dielectric constant that when coated allows said antimicrobial compound to form a chain-like structure for the passage of silver ions.

There is still needed a simple and cost effective method for manufacturing silver particles that are highly effective as antimicrobials and conductive materials.

SUMMARY OF THE INVENTION

This invention provides a composition of matter comprising associated predominantly silver nanoparticles. It further provides a method of making associated predominantly silver nanoparticles comprising
providing a source of soluble silver,
reducing the soluble silver into silver metal using a reducing agent,
supplying a polymer that is soluble in a non-aqueous solvent and a non-aqueous solvent; and allowing the growth of the nanoparticles in the presence of the polymer and non-aqueous solvent.

The invention also provides an article comprising an antimicrobial amount of a nanoparticle composition comprising associated predominantly silver metal nanoparticles, wherein said composition is either applied to the surface of or integrated into the article; and a medium comprising a support and coated on the surface thereof an antimicrobial layer comprising associated predominantly silver metal nanoparticles. It further provides an article comprising on the surface thereof a composition comprising associated predominantly silver metal nanoparticles, wherein said composition is applied to the surface in an amount and in a format suitable for conducting electrical current.

There is also provided a method of inhibiting the growth of microorganisms comprising contacting said microorganisms or their surrounding environment with a composition or an article comprising associated predominantly silver metal nanoparticles. There is further provided a method of conducting an electrical current comprising passing an electrical current through an article comprising on the surface thereof a composition comprising associated predominantly silver metal nanoparticles, wherein said composition is applied to the surface in an amount and in a format suitable for conducting electrical current.

The nanoparticles of the invention can be prepared under lower temperature conditions. Specifically they can be prepared with a reaction temperature less than 90° C. or preferably the temperature is less than 35° C. The reaction can be completed in less than 60 minutes or preferably the reaction time is less than 30 minutes. The process is simple and cost effective and creates formulations of silver based materials with a defined concentration of the active species. The nanoparticles can be used in conductive coatings, conductive adhesives, or as anti-microbial agents.

DETAILED DESCRIPTION OF THE INVENTION

Figure 1:
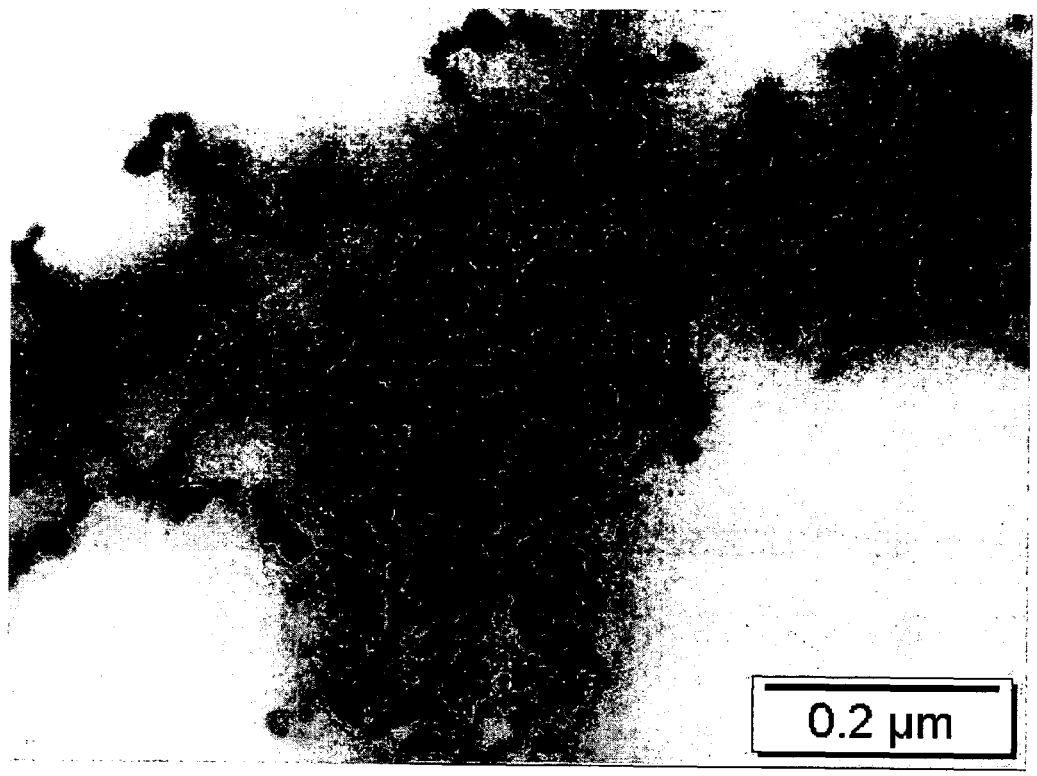
FIG. 1 depicts an electron micrograph of the silver nanoparticles made in Example 2.

The nanoparticles of the current invention are associated nanoparticles. They differ from conventional silver nanoparticles because of their associative nature. The term "associated" means that most particles touch or connect with at least one other particle and preferably more than one other particle. Preferably the particles form a chain. At least 50 percent by number, more preferably at least 80 percent, and most preferably at least 90 percent of the particles must touch or connect with at least one other particle. In one embodiment the associative nature of the nanoparticles allows them to conduct electricity. The nanoparticles preferably have a mean particle size ranging from 5 nm to 30 nm, and more preferably the nanoparticles have a mean particle size ranging from 5 nm to 15 nm. The silver particles may be any shape, including, for example, spherical, octahedral, cubic, tabular or irregular. Generally they are spherical.

The nanoparticles of the invention are predominantly silver meaning that they are greater than 50 weight % silver. Preferably they are greater than 90 weight % silver, and more preferably they are greater than 95 weight % silver. The nanoparticles may further comprise other metals such as copper, zinc, nickel, gold or platinum. In one preferred embodiment the nanoparticles further comprise up to 50 percent of copper.

In one embodiment the nanoparticles composition is made by the method of
providing a source of soluble silver,
reducing the soluble silver into silver metal using a reducing agent,
supplying a polymer that is soluble in a non-aqueous solvent and a non-aqueous solvent; and allowing the growth of the nanoparticles in the presence of the polymer and non-aqueous solvent.

The source of soluble silver may be any silver species that are soluble in solvent. Preferably the source of soluble silver is a soluble silver salt. In one embodiment the soluble silver salt is silver trifluoroacetate. The soluble silver source, preferably a silver salt, is contacted with a reducing agent; generally by adding the silver salt and reducing agent to a reaction vessel containing the solvent and polymers. In one preferred method the soluble silver salt is reduced with a reducing agent in a reaction vessel at room temperature under vigorous stirring for 30 minutes. These reaction conditions may be varied by means known to those skilled in the art as long as they do not affect the final product. A preferred reducing agent is a photographic developing agent. A developing agent effects a more efficient formation of metallic silver, enabling milder conditions to be used. Reducing agents are defined as any chemical capable of reducing the soluble silver into silver metal. Examples of reducing agents, and more particularly developing agents, include ascorbic acid palmitate, amines, t-butylamine borane, hydroquinones, catechols, pyrogallols, p-phenylenediamines and o-phenylenediamines, p-aminophenols, complexes of Fe(II), Ti(III) and V(II), stannous chloride, hydrogen peroxide, hydroxylamines, hydrazines, hydrazides, sulfonylhydrazides, ascorbic acid and its esters, alpha-aminocarbonyl compounds (alpha-aminoketones), hydroxytetronic acid, 1-phenyl-3-pyrazolidinone (Phenidone) and its derivatives, and other compounds as described in Chapter 11 of "The Theory of the Photographic Process", T. H. James, ed., $4^{th}$ Edition, Macmillan (1977). Preferred reducing agents include but are not limited to ascorbic acid esters, such as ascorbic acid palmitate and amines such as tributylamine. However, mixtures of reducing agents can be very useful.

If one or more developing agents are used to reduce the silver source, it may be beneficial to include a source of alkalinity or basicity in the reaction medium. The activity of most developing agents increases as the alkalinity of the medium increases. In aqueous systems, the alkalinity or acidity is measured by pH. Increasing pH corresponds to increasing alkalinity. In non-aqueous systems, the concept of pH does not have rigorous meaning. Nevertheless, many compounds that cause increasing pH in aqueous systems will increase the alkalinity of non-aqueous solvent systems and increase the activity of developing agents in non-aqueous solvent systems. Such sources of base or alkalinity include basic salts such as the carbonates, borates, phosphates, oxides, and hydroxides of alkali and alkaline earth metals such as lithium, sodium, potassium, magnesium, and calcium, and of tetraalkylammonium ions such as tetra-n-butylammonium. Also included are ammonia and substituted amines, such as tri-n-butylamine.

The nanoparticles are grown in the presence of a polymer that is soluble in a non-aqueous solvent. The polymer or a mixture of polymers and the solvent may be added at any point in the process as long as they are present during the growth step. Preferably they are added at the start of the reduction process. A non-aqueous solvent is defined as any solvent other than water. The polymer that may be utilized is any polymer that is soluble in the non-aqueous solvent.

Non-aqueous solvents useful in the present invention include organic compounds that are liquids at the temperature used to prepare colloidal silver or the silver compound that is reduced to the colloidal silver. These solvents include aliphatic and aromatic hydrocarbon compounds such as hexane, cyclohexane, and benzene, which may be substituted with one or more alkyl groups containing from 1-4 carbon atoms. These solvents also include compounds with hydrogen-bond accepting ability. Such solvents may include one or more of the following functional groups: hydroxy groups, amino groups, ether groups, carbonyl groups, carboxylic ester groups, carboxylic amide groups, ureido groups, sulfoxide groups, sulfonyl groups, thioether groups, and nitrile groups. These solvents include alcohols, amines, ethers, ketones, aldehydes, esters, amides, ureas, urethanes, sulfoxides, sulfones, sulfonamides, sulfate esters, thioethers, phosphines, phosphite esters, and phosphate esters. Furthermore the solvents may be miscible with water such that a solvent/water mixture comprising as much as 10% by volume of water may be used as the solvent in the present invention. Preferably the solvent is a ketone. Examples of useful non-aqueous solvents include, but are not limited to, acetone, methyl ethyl ketone, acetophenone, cyclohexanone, 4-hydroxy-4-methyl-2-pentanone, isopropanol, ethylene glycol, propylene glycol, diethylene glycol, benzyl alcohol, furfuryl alcohol, glycerol, cyclohexanol, pyridine, piperidine, morpholine, triethanolamine, triisopropanolamine, dibutylether, 2-methoxyethyl ether, 1,2-diethoxyethane, tetrahydrofuran, p-dioxane, anisole, ethyl acetate, ethylene glycol diacetate, butyl acetate, gamma-butyrolactone, ethyl benzoate, N-methylpyrrolidinone, N,N-dimethylacetamide, 1,1,3,3-tetramethylurea, thiophene, tetrahydrothiophene, dimethylsulfoxide, dimethylsulfone, methanesulfonamide, diethyl sulfate, triethylphosphite, triethylphosphate, 2,2'-thiodiethanol, acetonitrile, and benzonitrile. The solvents do not include polyethylene glycol.

The polymer may be any polymer which is soluble in a non-aqueous solvent. Examples of the polymer include polyvinylbutyral or a copolymer thereof. In one preferred embodiment the polymer is polyvinylbutyral-co-vinyl alcohol co-vinyl acetate. The nanoparticles may be stored or sold as a composition comprising the polymer and solvent. Other components of the composition may include any other chemicals that may enhance either electric conductivity or anti-microbial efficacy.

The invention further comprises a method of making associated predominantly silver nanoparticles comprising providing a source of soluble silver,
reducing the soluble silver into silver metal using a reducing agent,
supplying a polymer that is soluble in a non-aqueous solvent and a non-aqueous solvent; and allowing the growth of the nanoparticles in the presence of the polymer and non-aqueous solvent. A major advantage of the method is that it can be performed at a lower temperature than many of the prior art methods. The method may be performed at a temperature below 90 degrees C., more preferably below 55 degrees C. and most preferably below 30 degrees.

The nanoparticle composition may be concentrated or the nanoparticles may be isolated by filtration or other means, such as centrifugation. The nanoparticle composition may then be applied to an article for use, for example, as an antimicrobial or as a conductive material.

Articles having antimicrobial properties may be prepared by application of the antimicrobial compound (i.e. the silver nanoparticles) (hereafter referred to as AMC) to the surface of the article, or by embedding an AMC within the article. In most instances, bacteria or microbes may reside only at the surface of an article, and thus the AMC is applied only to the surface. The AMC may be applied by many methods such as coating, spraying, casting, blowing, extruding, etc. Typically, the AMC is dissolved or dispersed in a vehicle (such as a solvent) and a binder (such as a polymer). The vehicle serves multiple purposes including aiding the application of the antimicrobial composition via painting, spraying, coating, etc, binding the antimicrobial to that surface, and preventing the loss of antimicrobial activity due to normal wear or use. The vehicle used may be a polymer, a polymeric latex, a polymeric resin, an adhesive, or a glass or ceramic vehicle; i.e., the vehicle should comprise no more than 40% of the vehicle/antimicrobial composition mixture. Alternatively, the AMC may be mixed or compounded directly within the polymer, and the mixture subsequently melted and extruded to form a film. The film may then be attached to an article by means such as gluing or lamination. The inventive composition may be applied to the surfaces of walls, countertops, floors, furniture, consumer items, packaging, medical products such as bandages, garments, prosthetics, etc. to prevent the growth of microbes such as bacteria, mold, and yeast and to reduce the risk of the transmission of infectious disease.

The AMC may also be used in an antimicrobial medium, preferably a film, comprising a support and an antimicrobial layer comprising the above-described antimicrobial composition. Examples of supports useful for practice of the invention are resin-coated paper, paper, polyesters, or microporous materials such as polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyether imides; and mixtures thereof. The papers listed above include a broad range of papers, from high end papers, such as photographic paper to low end papers, such as newsprint. Another example of supports useful for practice of the invention is fabrics such as wools, cotton, polyesters, etc. Preferably the support is flexible.

Silver is known to be an excellent conductor. It is possible to have a coating of silver particles on a substrate and achieve high electric conductivity, good transparency and ruggedness. Thus this invention further relates to the conductive coating either on film or glass. The conductive coating can be used in liquid crystal display devices, touch panel devices, electro-Luminescence displays, etc.

Silver is also known to be an excellent conductor. It is possible to have a coating of silver particles on a substrate and achieve high electric conductivity, good transparency and ruggedness. Thus this invention further relates to an article comprising on the surface thereof a composition comprising predominantly silver metal particles, wherein said composition is applied to the surface in an amount and in a format suitable for conducting electrical current. The coating may be done on, for example, film or glass. The conductive coating can be used in liquid crystal display devices, touch panel devices, electro-Luminescence displays, etc.

The following examples are intended to illustrate, but not to limit, the invention.

EXAMPLES

Example 1

Preparation of Nanoparticles BIT-C1B (Invention)

To 200 g of Butvar76 solution (5% Butvar76 and 95% acetone) 10 g of tributyl amine and 10 g of silver solution (2 g of silver trifluoroacetate and 8 g of acetone) were added with vigorous stirring and the resulting solution is let sit at room temperature for 30 minutes. The nanoparticles have an average diameter of ca. 15 nm and over 80% of the resulting nanoparticles associate with each other.

Example 2

Preparation of Nanoparticles BIT-C2B (Invention)

To 200 g of Butvar76 solution (10% Butvar76 and 90% acetone) 10 g of tributyl amine and 10 g of silver solution (2 g of silver trifluoroacetate and 8 g of acetone) were added with vigorous stirring and the resulting solution was allowed to sit at room temperature for 30 minutes. The Transmission Electron Microscope image of the resulting silver nanoparticles appears in FIG. 1. The nanoparticles have an average diameter of ca 10 nm and over 90% of the nanoparticles associate with each other.

The invention has been described in detail with particular reference to certain preferred embodiments thereof, but it will be understood that variations and modifications can be effected within the spirit and scope of the invention.

The invention claimed is:

1. A composition of matter comprising associated predominantly silver metal nanoparticles, a polymer that is soluble in a non-aqueous solvent and a non-aqueous solvent, wherein greater than 80% by number of the nanoparticles touch or connect with at least one other particle.

2. The composition of claim 1 wherein greater than 90% by number of the nanoparticles touch or connect with at least one other particle.

3. The composition of claim 1 wherein the nanoparticles arc greater than 95 weight % silver.

4. The composition of claim 1 wherein the nanoparticles further comprise copper, zinc, nickel, gold or platinum.

5. The composition of claim 1 wherein the nanoparticles further comprise copper.

6. The composition of claim 1 wherein the nanoparticles have a mean particle size range of 5 nm to 30 nm.

7. The composition of claim 1 wherein the nanoparticles have a mean particle size range of 5 nm to 15 nm.

8. The composition of claim 1 wherein the polymer is a polyvinylbutyral or a copolymer thereof.

9. The composition of claim 8 wherein the polymer is polyvinylbutyral-co-vinyl alcohol co-vinyl acetate.

10. The composition of claim 1 wherein the non-aqueous solvent is a ketone.

11. The composition of claim 1 made by the method of
providing a source of soluble silver salt,
reducing the soluble silver ion into silver metal using a reducing agent,
supplying a polymer that is soluble in a non-aqueous solvent and a non-aqueous solvent; and
allowing growth of the nanoparticles in the presence of the polymer soluble in a non-aqueous solvent and a non-aqueous solvent.

12. The composition of claim 11 wherein the soluble silver is a soluble silver salt.

13. The composition of claim 12 wherein the soluble silver salt is silver trifluoroacetate.

14. The composition of claim 11 wherein the non-aqueous solvent is a ketone.

15. The composition of claim 11 wherein the polymer is a polyvinylbutyral or a copolymer thereof.

16. The composition of claim 15 wherein the polymer is polyvinylbutyral-co-vinyl alcohol co-vinyl acetate.

17. The composition of claim 11 wherein the reducing agent is tin(II) chloride, ascorbic acid palmitate, potassium tetrachloroaurate or tributylamine.

18. A method of making the composition of claim 1 comprising associated predominantly silver metal nanoparticles comprising
providing a source of soluble silver,
reducing the soluble silver into silver metal using a reducing agent,
supplying a polymer that is soluble in a non-aqueous solvent and a non-aqueous solvent; and
allowing the growth of the nanoparticles in the presence of the polymer and non-aqueous solvent.

19. The method of claim 18 wherein the process is performed at a temperature below 90 degrees C.

20. The method of claim 18 wherein the process is performed at a temperature below 35 degrees C.

21. The method of claim 18 wherein greater than 90% by number of the nanoparticles touch or connect with at least one other particle.

22. The method of claim 18 wherein the nanoparticles are greater than 90 weight % silver.

23. The method of claim 18 wherein the nanoparticles are greater than 95 weight % silver.

24. The method of claim 18 wherein the nanoparticles further comprise copper, zinc, nickel, gold or platinum.

25. The method of claim 18 wherein the nanoparticles further comprise copper.

26. The method of claim 18 wherein the nanoparticles have a mean particle size range of 5 nm to 30 nm.

27. The method of claim 18 where the nanoparticles have a mean particle size range of 5 nm to 15 nm.

28. A method of making the composition of claim 1 comprising associated predominantly silver metal nanoparticles comprising
providing a soluble silver salt,
reducing the soluble silver salt into silver metal using tin(II) chloride, ascorbic acid palmitate or potassium tetrachloroaurate,
supplying polyvinylbutyral or a copolymer thereof and a ketone solvent; and
allowing the growth of the nanoparticles in the presence of the polyvinylbutyral or a copolymer thereof and the ketone solvent; wherein the method is performed at a temperature below 35 degrees C.

29. The method of claim 28 wherein the resulting nanoparticle composition is concentrated or filtered.

30. An article comprising an antimicrobial amount of a nanoparticle composition of claim 1 comprising associated predominantly silver metal nanoparticles, wherein said composition is either applied to the surface of or integrated into the article.

31. A device comprising a composition of claim 1 comprising associated predominantly silver metal nanoparticles, wherein said composition is utilized in the device in an amount and in a format suitable for conducting electrical current.

32. The device of claim 31 wherein said device is a liquid crystal display device, a touch panel device or an Electro-Luminescence display device.

33. An article comprising on the surface thereof a composition of claim 1 comprising associated predominantly silver metal nanoparticles, wherein said composition is applied to the surface in an amount and in a format suitable for conducting electrical current.

34. A medium comprising a support and coated on the surface thereof an antimicrobial layer comprising the composition of claim 1 comprising associated predominantly silver metal nanoparticles.

35. The medium of claim 34 wherein the medium is flexible.

36. A method of inhibiting the growth of microorganisms comprising contacting said microorganisms or their surrounding environment with a composition of claim 1 comprising associated predominantly silver metal nanoparticles.

37. A method of inhibiting the growth of microorganisms comprising contacting said microorganisms or their surrounding environment with an article comprising the composition of claim 1 comprising associated predominantly silver metal nanoparticles.

38. A method of conducting an electrical current comprising passing an electrical current through a device comprising a composition of claim 1 comprising associated predominantly silver metal nanoparticles, wherein said composition is utilized in the device in an amount and in a format suitable for conducting electrical current.

* * * * *